United States Patent
Zhao et al.

(10) Patent No.: US 11,117,784 B2
(45) Date of Patent: Sep. 14, 2021

(54) HYBRID FIBER TENSION MEMBER FOR ELEVATOR SYSTEM BELT

(71) Applicant: Otis Elevator Company, Farmington, CT (US)

(72) Inventors: Wenping Zhao, Glastonbury, CT (US); Daniel A. Mosher, Glastonbury, CT (US); Chen Qian Zhao, Newark, DE (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 631 days.

(21) Appl. No.: 15/958,727

(22) Filed: Apr. 20, 2018

(65) Prior Publication Data
US 2018/0305182 A1    Oct. 25, 2018

Related U.S. Application Data

(60) Provisional application No. 62/487,883, filed on Apr. 20, 2017.

(51) Int. Cl.
*B66B 7/06* (2006.01)
*D07B 1/00* (2006.01)
(Continued)

(52) U.S. Cl.
CPC .............. *B66B 7/062* (2013.01); *D07B 1/005* (2013.01); *D07B 1/162* (2013.01); *D07B 1/165* (2013.01);
(Continued)

(58) Field of Classification Search
CPC .... B66B 7/062; F16G 5/14; D07B 2501/2007
See application file for complete search history.

(56) References Cited

U.S. PATENT DOCUMENTS 4,470,249 A * 9/1984 Chiappetta ............... D07B 1/16
57/213
5,566,786 A * 10/1996 De Angelis ............... B66B 7/06
187/266

(Continued)

FOREIGN PATENT DOCUMENTS

CN    102264623 A    11/2011
CN    104973480 A    10/2015
(Continued)

OTHER PUBLICATIONS

European Search Report Issued in EP Application No. 18168007.5, dated Sep. 3, 2018, 8 Pages.
(Continued)

*Primary Examiner* — Diem M Tran
(74) *Attorney, Agent, or Firm* — Cantor Colburn LLP

(57) ABSTRACT

A belt for an elevator system includes a plurality of tension members arranged along a belt width and extending longitudinally along a length of the belt. Each tension member includes a plurality of first fibers, and a plurality of second fibers different from the first fibers dispersed into the first fibers. A jacket material at least partially encapsulates the plurality of tension members. An elevator system includes a hoistway, an elevator car located in the hoistway and movable therein, and a belt operably connected to the elevator car to suspend and/or drive the elevator car along the hoistway. The belt includes a plurality of tension members arranged along a belt width and extending longitudinally along a length of the belt. Each tension member includes a plurality of first fibers and a plurality of second fibers different from the first fibers dispersed into the first fibers.

13 Claims, 3 Drawing Sheets

(51) Int. Cl.
*D07B 1/16* (2006.01)
*D07B 1/22* (2006.01)
*F16G 5/08* (2006.01)
*F16G 5/10* (2006.01)
*F16G 5/14* (2006.01)

(52) U.S. Cl.
CPC ............... *D07B 1/22* (2013.01); *F16G 5/08* (2013.01); *F16G 5/10* (2013.01); *F16G 5/14* (2013.01); *D07B 2201/2083* (2013.01); *D07B 2501/2007* (2013.01)

(56) References Cited

U.S. PATENT DOCUMENTS

| | | | | |
|---|---|---|---|---|
| 5,834,942 | A * | 11/1998 | De Angelis | D07B 1/145 324/522 |
| 8,360,208 | B2 * | 1/2013 | De Angelis | D07B 1/025 187/251 |
| 8,656,696 | B2 | 2/2014 | Bruch et al. | |
| 9,126,805 | B2 | 9/2015 | Pelto-Huikko et al. | |
| 9,248,473 | B2 | 2/2016 | Varkey et al. | |
| 9,834,409 | B2 * | 12/2017 | Kere | B66B 7/1238 |
| 9,944,493 | B2 * | 4/2018 | Dudde | B66B 7/062 |
| 2003/0037529 | A1 | 2/2003 | Hanna et al. | |
| 2008/0078157 | A1 * | 4/2008 | Dold | D07B 1/025 57/212 |
| 2011/0259677 | A1 | 10/2011 | Dudde et al. | |
| 2012/0015187 | A1 | 1/2012 | O'Donnell et al. | |
| 2012/0329591 | A1 | 12/2012 | Goeser et al. | |
| 2013/0206516 | A1 | 8/2013 | Pelto-Huikko et al. | |
| 2014/0305744 | A1 | 10/2014 | Kere et al. | |
| 2014/0345978 | A1 | 11/2014 | Alasentie et al. | |
| 2015/0037581 | A1 | 2/2015 | Varkey et al. | |
| 2015/0101889 | A1 | 4/2015 | Kere et al. | |
| 2015/0191332 | A1 * | 7/2015 | Kere | D07B 1/148 187/251 |
| 2015/0259176 | A1 | 9/2015 | Goeser et al. | |
| 2015/0307321 | A1 | 10/2015 | Breite et al. | |
| 2017/0043979 | A1 | 2/2017 | Kucharczyk et al. | |
| 2017/0100855 | A1 | 4/2017 | Taylor | |

FOREIGN PATENT DOCUMENTS

| | | | |
|---|---|---|---|
| DE | 1269590 B | * | 6/1968 |
| WO | 2015134025 A1 | | 9/2015 |
| WO | 2015173129 A1 | | 11/2015 |
| WO | 2016030298 A1 | | 3/2016 |
| WO | 2016096395 A1 | | 6/2016 |

OTHER PUBLICATIONS

Chinese Office Action for Chinese Application No. 201810356860.7, dated Jun. 6, 2020, 6 pages.

* cited by examiner

HYBRID FIBER TENSION MEMBER FOR ELEVATOR SYSTEM BELT

CROSS-REFERENCE TO RELATED APPLICATIONS

This application claims the benefit of 62/487,883, filed Apr. 20, 2017, which is incorporated herein by reference in its entirety.

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belts for supporting the elevator car and achieving the desired movement and positioning of the elevator car.

Where a belt is used as a load bearing member, a plurality of tension members are embedded in a common jacket. The jacket retains the tension members in desired positions and provides a frictional load path. In an exemplary traction elevator system, a machine drives a traction sheave with which the belts interact to drive the elevator car along a hoistway. Belts typically utilize tension members formed from steel elements, but alternatively may utilize tension members formed from synthetic fibers or other materials, such as carbon fiber composites.

BRIEF DESCRIPTION

In one embodiment, a belt for an elevator system includes a plurality of tension members arranged along a belt width and extending longitudinally along a length of the belt. Each tension member includes a plurality of first fibers, and a plurality of second fibers different from the first fibers dispersed into the first fibers. A jacket material at least partially encapsulates the plurality of tension members.

Additionally or alternatively, in this or other embodiments the first fibers are one or more of carbon, glass, aramid, nylon, and polymer fibers.

Additionally or alternatively, in this or other embodiments the first fibers are located in a matrix material.

Additionally or alternatively, in this or other embodiments the second fibers are high density polyethylene fiber.

Additionally or alternatively, in this or other embodiments a shell is located at an outer surface of the tension member formed from melted second fibers impregnated into first fibers at the outer surface.

Additionally or alternatively, in this or other embodiments the tension member includes a core portion and an outer ring portion.

Additionally or alternatively, in this or other embodiments one or more barrier layers are located between the core portion and the outer ring portion of the tension member.

Additionally or alternatively, in this or other embodiments the outer ring portion is formed by melting and subsequently hardening second fibers disposed at the outer ring portion.

Additionally or alternatively, in this or other embodiments the outer ring portion is formed by impregnating the outer ring portion with a matrix material.

Additionally or alternatively, in this or other embodiments the second fibers include one or more of Teflon, graphite, titanium oxide, boron nitride to lubricate and/or protect the first fibers.

Additionally or alternatively, in this or other embodiments a plurality of tension members are twisted or braided into a plurality of cords, a plurality of cords disposed in the belt.

In another embodiment, an elevator system includes a hoistway, an elevator car located in the hoistway and movable therein, and a belt operably connected to the elevator car to suspend and/or drive the elevator car along the hoistway. The belt includes a plurality of tension members arranged along a belt width and extending longitudinally along a length of the belt. Each tension member includes a plurality of first fibers and a plurality of second fibers different from the first fibers dispersed into the first fibers. A jacket material at least partially encapsulates the plurality of tension members.

Additionally or alternatively, in this or other embodiments the first fibers are one or more of carbon, glass, aramid, nylon, and polymer fibers.

Additionally or alternatively, in this or other embodiments the first fibers are located in a matrix material.

Additionally or alternatively, in this or other embodiments the second fibers are high density polyethylene fiber.

Additionally or alternatively, in this or other embodiments a shell is located at an outer surface of the tension member formed from melted second fibers impregnated into first fibers at the outer surface.

Additionally or alternatively, in this or other embodiments one or more barrier layers are located between a core portion and an outer ring portion of the tension member.

Additionally or alternatively, in this or other embodiments the second fibers include one or more of Teflon, graphite, titanium oxide, boron nitride to lubricate and/or protect the first fibers.

Additionally or alternatively, in this or other embodiments a plurality of tension members are twisted or braided into a plurality of cords, a plurality of cords disposed in the belt.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
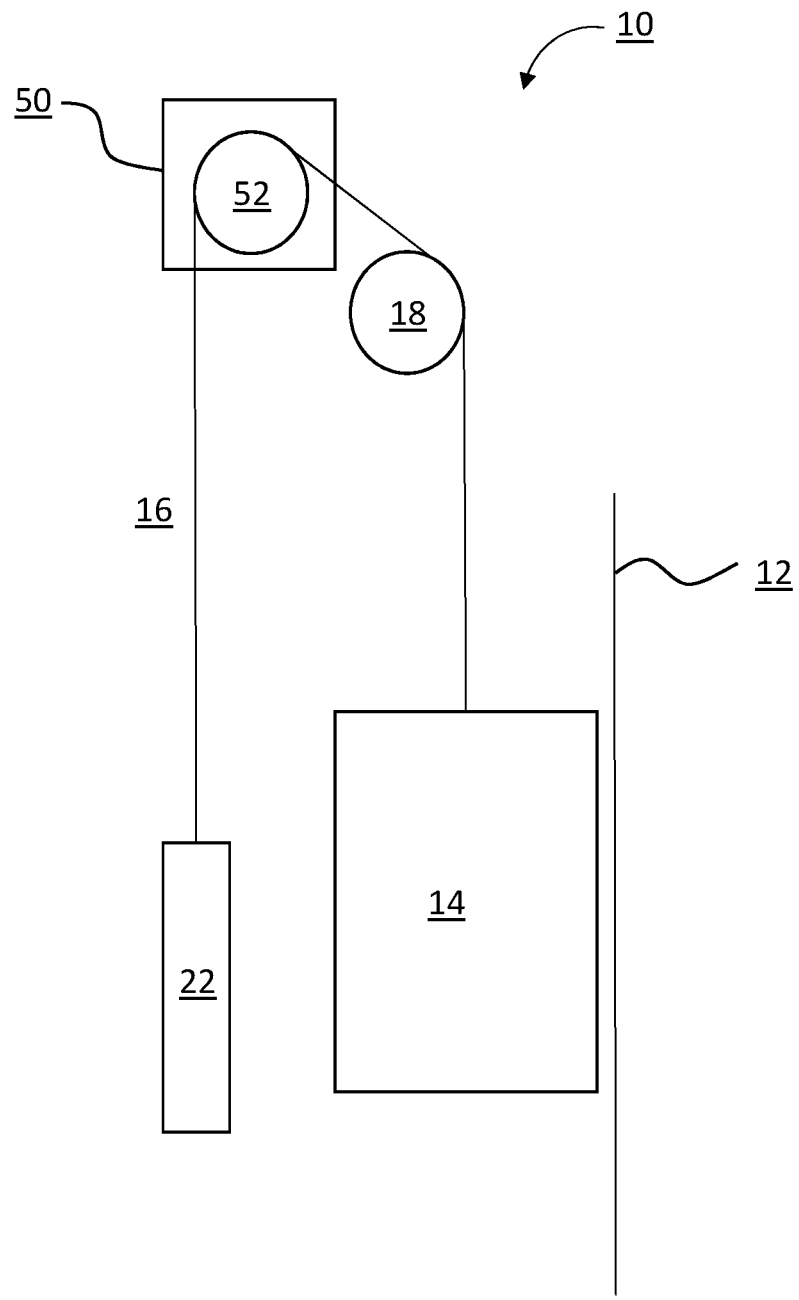
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more belts 16. The one or more belts 16 interact with sheaves 18 and 52 to be routed around various components of the elevator system 10. Sheave 18 is configured as a diverter, deflector or idler sheave and sheave 52 is configured as a traction sheave 52, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
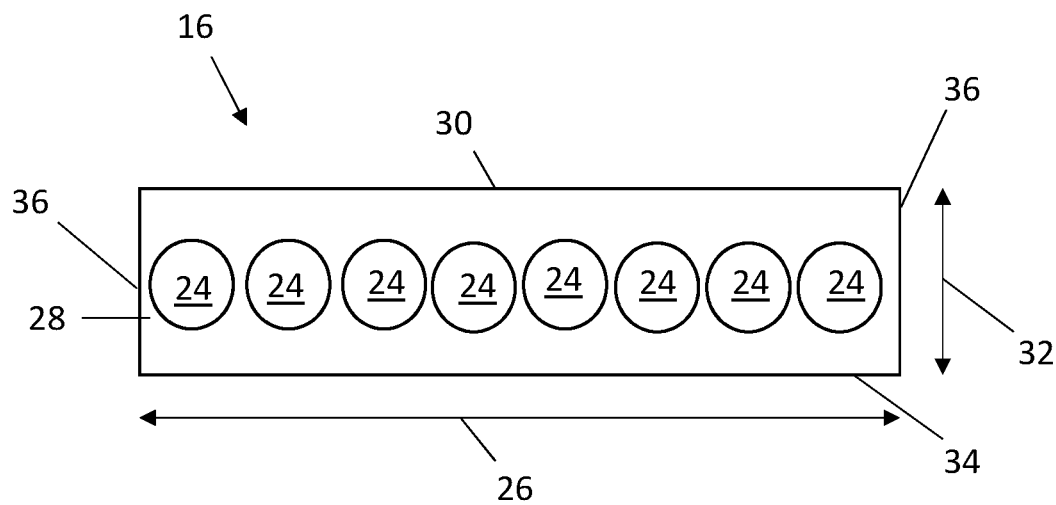
FIG. 2 is a schematic cross-sectional view of an embodiment of an elevator system belt.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket material 28 to restrain movement of the tension members 24 in the belt 16 and to protect the tension members 24. The jacket material 28 defines a traction side 30 configured to interact with a corresponding surface of the traction sheave 52. Exemplary materials for the jacket material 28 include the elastomers of thermoplastic and thermosetting polyurethanes, polyamide, thermoplastic polyester elastomers, and rubber, for example. Other materials may be used to form the jacket material 28 if they are adequate to meet the required functions of the belt 16. For example, a primary function of the jacket material 28 is to provide a sufficient coefficient of friction between the belt 16 and the traction sheave 52 to produce a desired amount of traction therebetween. The jacket material 28 should also transmit the traction loads to the tension members 24. In addition, the jacket material 28 should be wear resistant and protect the tension members 24 from impact damage, exposure to environmental factors, such as chemicals, for example.

In some embodiments, the jacket material 28 is formed from materials such as polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While eight tension members 24 are illustrated in the embodiment of FIG. 2, other embodiments may include other numbers of tension members 24, for example, 6, 10 or 12 tension members 24. Further, while the tension members 24 of the embodiment of FIG. 2 are substantially identical, in other embodiments, the tension members 24 may differ from one another.

Figure 3:
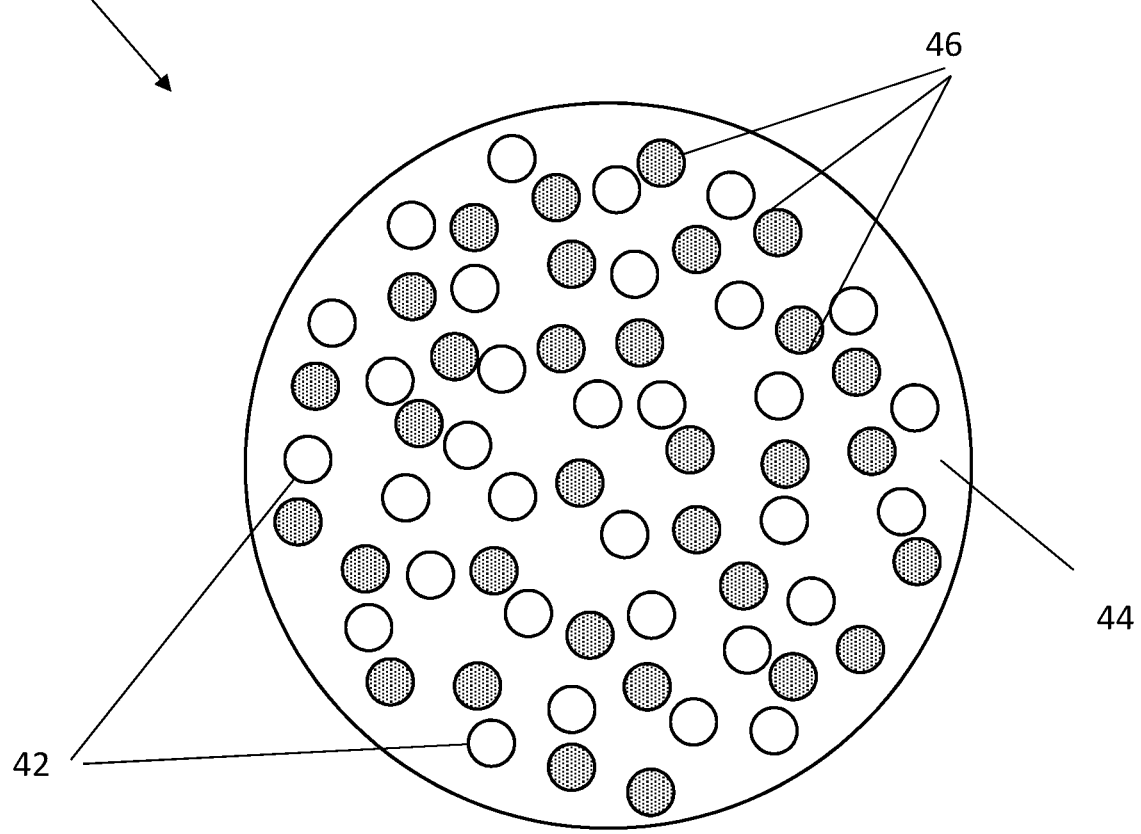
FIG. 3 is a schematic cross-sectional view of an embodiment of a tension member of an elevator system belt.

Referring now to FIG. 3, in some embodiments the tension members 24 each include a plurality of first fibers 42, such as liquid crystal polymer, carbon fiber, glass fiber or aramid fiber, and further includes a plurality of second fibers 46 dispersed between the first fibers 42. The second fiber 46 is a fiber having a high toughness relative to the first fibers 42, such as high density polyethylene (HDPE) or polypropylene. The second fibers 46 reduce direct contact between the first fibers 42 thereby reducing fraying of the first fibers 42.

In some embodiments, the tension member 24 may further include a matrix material 44 in which the first fibers 42 and second fibers 46 are disposed. Materials such as polyurethane, vinylester, or epoxy may be utilized as the matrix material. In other embodiments, the tension member 24 is formed without the use of matrix material 44, in a so-called "dry fiber" construction.

The tension member 24 may be formed as thin layers, in some embodiments by a pultrusion process. In a standard pultrusion process, the first fibers 42 are impregnated with the matrix material 44 and are pulled through a heated die and additional curing heaters where the matrix material 44 undergoes cross linking. In an exemplary embodiment, the tension member 24 has a cross-sectional thickness of about 0.5 millimeters to about 5 millimeters. Further, in some embodiments such as shown in FIG. 3, the tension member 24 has a circular cross-section, while in other embodiments the tension member 24 may have other cross-sectional shapes, such as rectangular, oval or elliptical. In, for example, configurations with circular, oval or elliptical cross-sections, a major diameter and/or a minor diameter of the tension member 24 may be between 0.5 millimeters and 5 millimeters.

Figure 4:
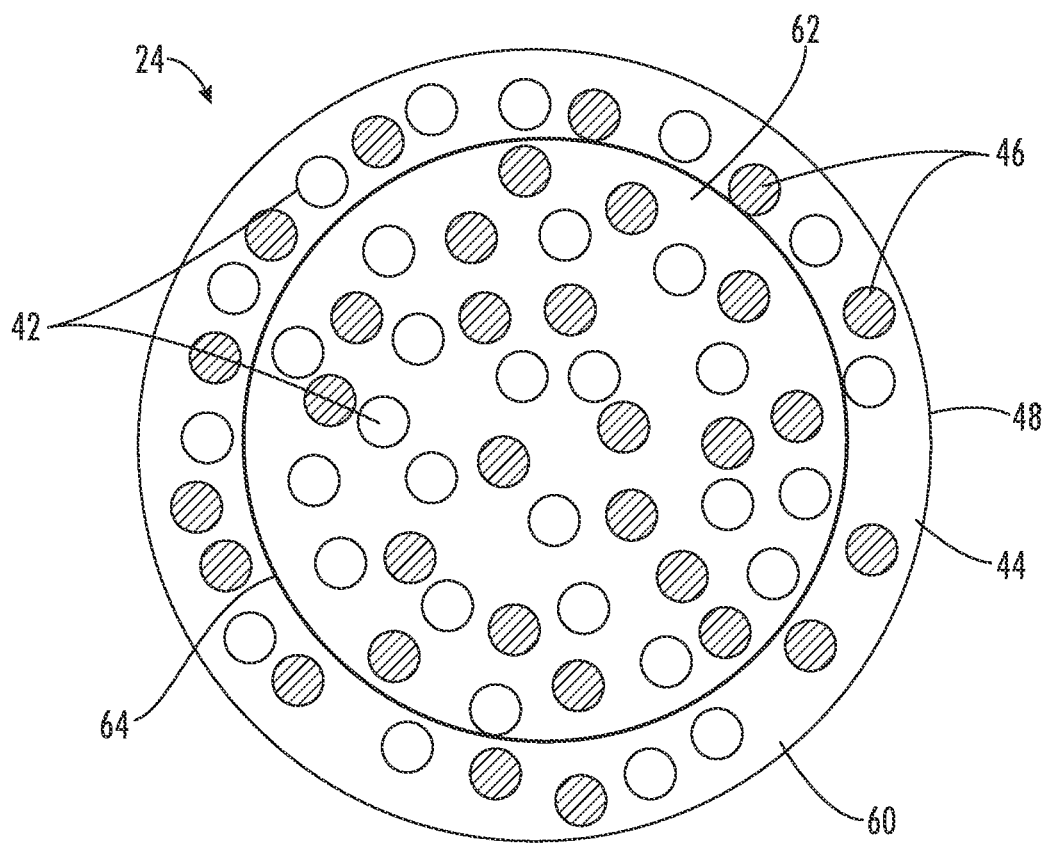
FIG. 4 is another schematic cross-sectional view of an embodiment of a tension member of an elevator system belt.

Referring now to FIG. 4, the tension member has a core portion 62 and an outer ring portion 60. In some embodiments, one or more barrier layers 64 separates the outer ring portion 60 from the core portion 62. The barrier layer 64 is formed from, for example, a thermoplastic or thermosetting polymer.

Figure 5:
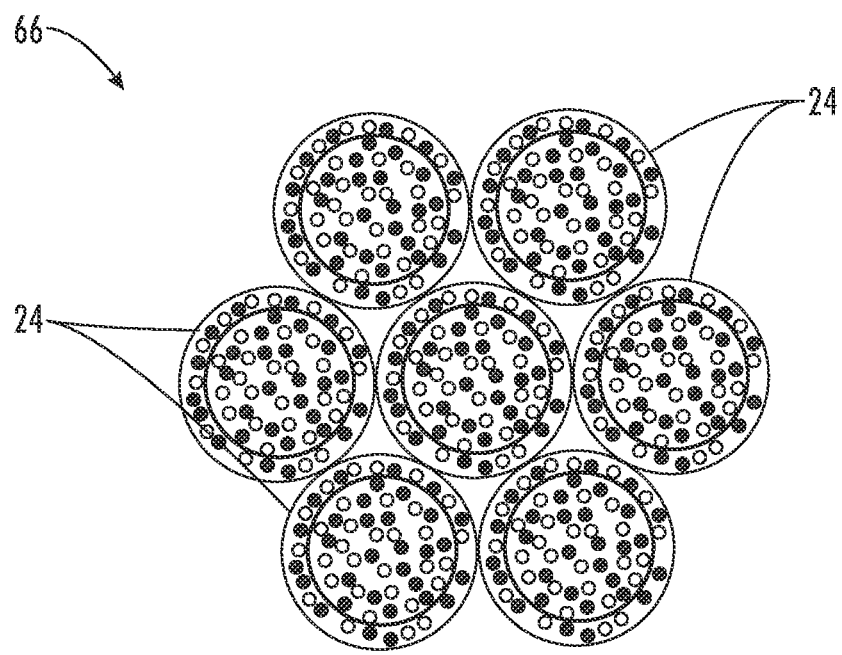
FIG. 5 is a schematic cross-sectional view of a cord for an elevator system belt.

In some embodiments, the outer ring portion 60 is formed by braiding or otherwise grouping first fibers 42, and in some embodiments including first fibers 42 and second fibers 46, and impregnating the outer ring portion 60 with the matrix material 44. The core portion 62, on the other hand, is formed as a dry fiber construction. In such embodiments, second fibers 46 may include materials such as, for example, Teflon, graphite, titanium oxide, boron nitride or similar materials to provide lubrication and protection to the first fibers 42. In another embodiment, once formed, an outer surface 48 of the tension member 24 is subjected to a surface heating process such that the second fibers 46 in the outer ring portion 60 may be melted an impregnate the first fibers 42 in the outer ring portion 60. Once cooled, this process results in a hard outer ring portion 60 of the tension element 24 to a selected depth from the outer surface 48 to protect the core portion 62 of the tension member 24 and to prevent fraying of the fibers 42 therein. Alternatively, the tension member 24 is fully heated such that the second fibers 46 melt and impregnate the first fibers 42 throughout the tension member 24, resulting in a flexible tension member 24. In some embodiments, the tension member 24 may be twisted or braided with other tension members 24 to form a rope or cord 66, such as shown in FIG. 5. Cord 66 itself may be used as tension member 24 in a belt 16.

Use of the hybrid fiber tension members 24 allows for better flexibility in tailoring the stiffness, strength and durability properties of the tension members 24 and belt 16, and allows for the selection of fibers and their proportions of use to meet selected requirements of the particular application or use.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
a plurality of tension members arranged along a belt width and extending longitudinally along a length of the belt, each tension member including:
a core portion including:
a first plurality of first fibers;
a first plurality of second fibers different from the first plurality of first fibers dispersed between fibers of the first plurality of first fibers, the core portion formed as a dry fiber construction without a matrix material:
an outer ring portion surrounding the core portion, the outer ring portion including:
a second plurality of first fibers:
a second plurality of second fibers; and
a matrix material into which the second plurality of first fibers and the second plurality of second fibers are arranged; and
a jacket material at least partially encapsulating the plurality of tension members;
further comprising one or more barrier layers disposed between the core portion and the outer ring portion of each tension member of the plurality of tension members.

2. The belt of claim 1, wherein the first plurality of first fibers and the second plurality of first fibers are one or more of liquid crystal polymer, carbon, glass, aramid, nylon, and polymer fibers.

3. The belt of claim 1, wherein the first plurality of second fibers and the second plurality of second fibers are high density polyethylene or polypropylene fiber.

4. The belt of claim 1, further comprising a shell at an outer surface of each tension member of the plurality of tension members formed from melted second fibers of the second plurality of second fibers impregnated into the second plurality of first fibers at the outer surface.

5. The belt of claim 1, wherein the first plurality of second fibers include one or more of Teflon, graphite, titanium oxide, boron nitride to lubricate and/or protect the first plurality of first fibers.

6. The belt of claim 1, wherein two or more tension members of the plurality of tension members are twisted or braided into a plurality of cords, the plurality of cords disposed in the belt.

7. The belt of claim 1, wherein the jacket material is selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

8. An elevator system, comprising: a hoistway;
an elevator car disposed in the hoistway and movable therein;
a belt operably connected to the elevator car to suspend and/or drive the elevator car along the hoistway, the belt including:
a plurality of tension members arranged along a belt width and extending longitudinally along a length of the belt, each tension member including:
a core portion including:
a first plurality of first fibers;
a first plurality of second fibers different from the first plurality of first fibers dispersed into between fibers of the first plurality of first fibers, the core portion formed as a dry fiber construction without a matrix material:
an outer ring portion surrounding the core portion, the outer ring portion including:
a second plurality of third first fibers:
a second plurality of fourth second fibers; and
a matrix material into which the second plurality of third first fibers and the second plurality of fourth second fibers are arranged; and
a jacket material at least partially encapsulating the plurality of tension members;
further comprising one or more barrier layers disposed between the core portion and the outer ring portion of each tension member.

9. The elevator system of claim 8, wherein the first plurality of first fibers and the second plurality of first fibers are one or more of liquid crystal polymer, carbon, glass, aramid, nylon, and polymer fibers.

10. The elevator system of claim 8, wherein the first plurality of second fibers and the second plurality of second fibers are high density polyethylene or polypropylene fiber.

11. The elevator system of claim 8, further comprising a shell at an outer surface of each tension member formed from melted second fibers of the second plurality of second fibers impregnated into first fibers of the second plurality of first fibers at the outer surface.

12. The elevator system of claim 8, wherein the first plurality of second fibers include one or more of Teflon, graphite, titanium oxide, boron nitride to lubricate and/or protect the first plurality of first fibers.

13. The elevator system of claim 8, wherein two of more tension members of the plurality of tension members are twisted or braided into a plurality of cords, the plurality of cords disposed in the belt.

\* \* \* \* \*